US008064662B2

(12) United States Patent
Bi

(10) Patent No.: US 8,064,662 B2
(45) Date of Patent: Nov. 22, 2011

(54) SPARSE COLLABORATIVE COMPUTER AIDED DIAGNOSIS

(75) Inventor: Jinbo Bi, Chester Springs, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1034 days.

(21) Appl. No.: 11/776,838

(22) Filed: Jul. 12, 2007

(65) Prior Publication Data

US 2008/0012855 A1      Jan. 17, 2008

Related U.S. Application Data

(60) Provisional application No. 60/831,347, filed on Jul. 17, 2006.

(51) Int. Cl.
*G06K 9/00* (2006.01)

(52) U.S. Cl. ...................................................... 382/128

(58) Field of Classification Search .......... 382/128–134; 128/920–925; 356/39–49; 600/407–414, 600/424–426; 345/581–618
See application file for complete search history.

(56) References Cited

U.S. PATENT DOCUMENTS

| 5,062,066 | A  | * | 10/1991 | Scher et al. ........................ 703/6 |
| 5,800,179 | A  | * | 9/1998 | Bailey ............................ 434/262 |
| 2002/0028021 | A1 | * | 3/2002 | Foote et al. .................... 382/224 |
| 2003/0058268 | A1 | * | 3/2003 | Loui et al. ..................... 345/719 |

OTHER PUBLICATIONS

Ando, R. K., and Zhang, T. 2005. A framework for learning predictive structures from multiple tasks and unlabeled data. *Journal of Machine Learning Research* 6:1855-1887.
Argyriou, A.; Evgeniou, T.; and Pontil, M. 2007. Multitask feature learning. In Scholkopf, B.; Platt, J.; and Hoffman, T., eds., *Advances in Neural Information Processing Systems 19*. Cambridge, MA: MIT Press.
Bi, J.; Bennett, K.; Embrechts, M.; Breneman, C.; and Song, M. 2003. Dimensionality reduction via sparse support vector machines. *Journal of Machine Learning Research* 3:1229-1243.
Buchbinder, S.; Leichter, I.; Lederman, R.; Novak, B.; Bamberger, P.; Sklair-Levy, M.; Yarmish, G.; and Fields, S. 2004. Computer-aided classification of BI-RADS category 3 breast lesions. *Radiology* 230:820-823.
Evgniou, T., and Pontil, M. 2004. Regularized multi-task learning. In *Proc. of 17-th SIGKDD Conf. on Knowledge Discovery and Data Mining*.
Heskes, T. 2000. Empirical bayes for learning to learn. In Langley, P., ed., *Proceedings of the 17th International Conference on Machine Learning*, 367-374.
Weston, J.; Elisseeff, A.; Scholkopf, B.; and Tipping. M. 2003. Use of the zero-norm with linear models and kernel methods. *Journal of Machine Learning Research* 3:1439-1461.
Zhu, J.; Rosset, S.; Hastie, T.; and Tibshirani. R. 2004. 1-norm support vector machines. In Thrun, S.; Saul, L.; and Scholkopf, B., eds., *Advances in Neural Information Processing Systems 16*. Cambridge, MA: MIT Press.

* cited by examiner

*Primary Examiner* — Samir Ahmed
*Assistant Examiner* — Atiba Fitzpatrick
(74) *Attorney, Agent, or Firm* — Peter Withstandley

(57) ABSTRACT

A method for modeling an image for multiple tasks includes providing an image with n image features, providing an indicator matrix which has m non-zero components corresponding to m selected features selected from the n image features, constructing a model of the image using the m selected features for each specific labeling task. There is a variable for a specific task to be performed on the image and a variable for a plurality of tasks to be performed on the image.

8 Claims, 5 Drawing Sheets

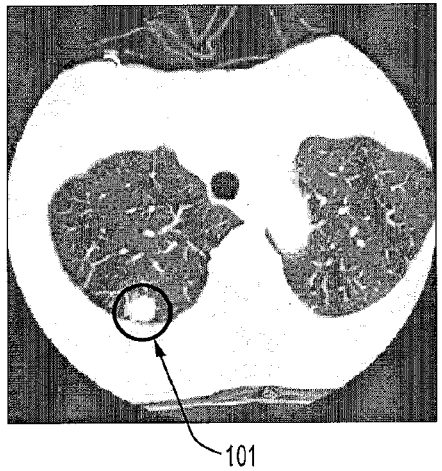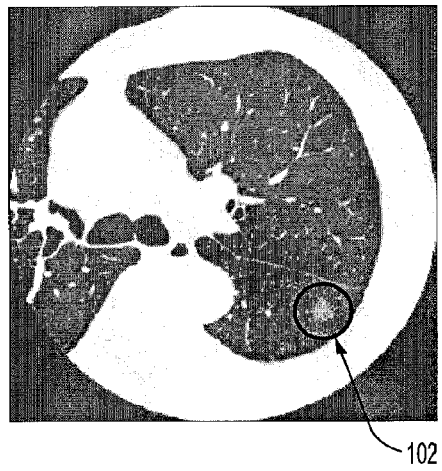
FIG. 1A  FIG. 1B
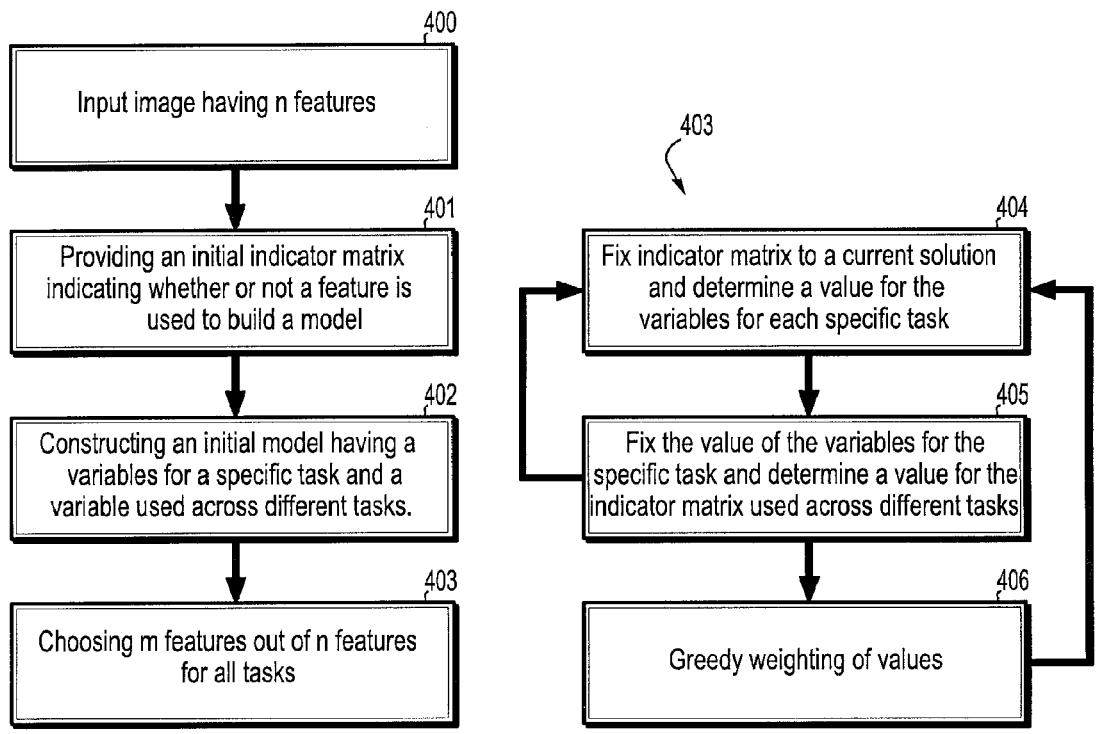
FIG. 4A  FIG. 4B

SPARSE COLLABORATIVE COMPUTER AIDED DIAGNOSIS

CROSS-REFERENCE TO RELATED APPLICATION

This application claims priority to U.S. Provisional Application Ser. No. 60/831,347, filed on Jul. 17, 2006, which is herein incorporated by reference in its entirety.

BACKGROUND OF THE INVENTION

1. Technical Field

The present invention relates to computer aided diagnosis of disease, and more particularly to a system and method for sparse collaborative computer aided diagnosis.

2. Discussion of Related Art

Computer-aided diagnosis (CAD) systems have moved from the sole realm of academic publications, to robust commercial systems that are used by physicians in their clinical practice. In many CAD applications, the goal is to detect potentially malignant tumors and lesions in medical images. It is well recognized that CAD systems decrease detection and recognition errors as a second reader and reduce mistakes related to misinterpretation.

CAD systems typically focus on the diagnosis of a single isolated disease using images taken only for the specific disease. This approach neglects certain aspects of typical diagnosis procedures where physicians examine primary symptoms and tests of the disease in conjunction with other related information, such as symptoms of clinically-related conditions, patient history of other diseases and medical knowledge of highly correlated diseases.

The collaborative learning problem may be cast as a multi-task learning, a collaborative filtering or a collaborative prediction problem, depending on an application. Multi-task learning is able to capture the dependencies among tasks when several related learning problems are available. It is important to define task relatedness among tasks. A common hidden structure for all related tasks is assumed. One way to capture the task relatedness is through hierarchical Bayesian models. From the hierarchical Bayesian viewpoint, multi-task learning is essentially trying to learn a good prior over all tasks to capture task dependencies.

To tackle a CAD task, experimental features may be used to describe the potential cancerous structures or abnormal structures. This introduces irrelevant features or redundant features to the detection or classification problems. Feature selection has been an indispensable and challenging problem in this domain. Moreover, multiple tasks may be given that are related from the physical and medical perspectives are given with a limited sample size for each. Further, acquisition of medical data is expensive and time-consuming. For example, in the nodule and GGO detection tasks, often only around 100 patients are available.

Therefore, a need exists for a system and method of collaborative computer diagnosis including selecting significant features that are relevant to multiple tasks.

SUMMARY OF THE INVENTION

According to an embodiment of the present disclosure, a method for modeling an image includes providing an image with n image features, determining a diagonal indicator matrix having m non-zero diagonal components corresponding to m features selected from the n features, wherein the indicator matrix is used across different modeling tasks, and constructing a model of the image based on the selected m features, wherein the model includes a subset of the m features for a specific modeling task.

According to an embodiment of the present disclosure, a system for modeling an image includes a memory device storing a plurality of instructions embodying a feature selector, a processor for receiving an image with n image features and executing the feature selector to perform a method including determining a diagonal indicator matrix having m non-zero diagonal components corresponding to m features selected from the n features, wherein the indicator matrix is used across different modeling tasks, and constructing a model of the image based on the selected m features, wherein the model includes a subset of the m features for a specific modeling task.

BRIEF DESCRIPTION OF THE DRAWINGS

Preferred embodiments of the present invention will be described below in more detail, with reference to the accompanying drawings:

FIG. 1A is a slice of a lung CT image of a solid nodule;

FIG. 1B is a slice of a lung CT image of a GGO;

FIGS. 4A-B are flow charts of a method for selecting features corresponding to a model for a plurality of tasks according to an embodiment of the present disclosure.

DETAILED DESCRIPTION OF EXEMPLARY EMBODIMENTS

Figure 2A:
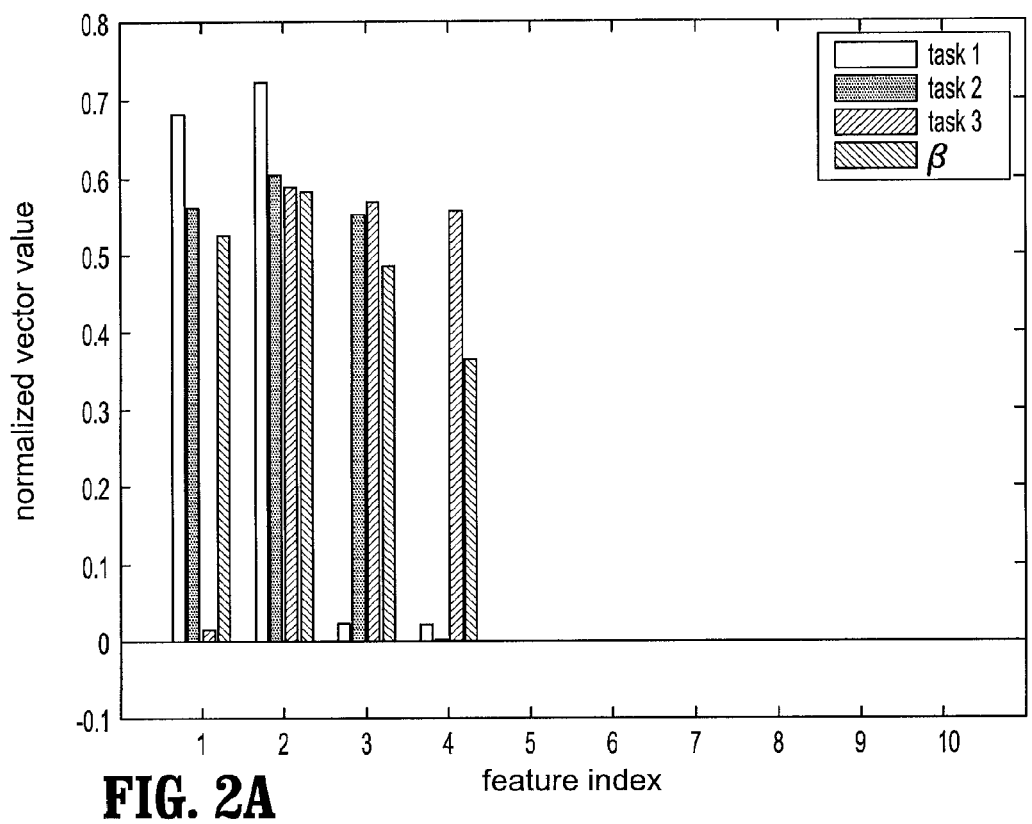
FIGS. 2A-C are graphs of system performance on synthetic data showing coefficient vectors by our approach, coefficient vectors by single-task 1-norm SVM, and accuracy comparison with various training sizes, respectively.

According to an embodiment of the present disclosure, in a method for modeling an image for multiple tasks, in each task, a correct model is determined that maps from an image to a label. A label can be, for example, abnormal or normal. In other words, an image is labeled according to whether or not a patient has a certain disease or has certain abnormal structure. It is assumed that certain features are extracted from the images to be used for labeling. A diagonal indicator matrix is used to indicate whether a feature is used to build the model of the image. This indicator matrix serves as the variable for a plurality of tasks to be performed on the image, and it indicates a common set of selected features that are relevant to all tasks. However, the model for a specific task may only use a subset of selected features. So there are variables for individual tasks. The diagonal indicator matrix and variables for individual tasks are determined iteratively.

According to an embodiment of the present disclosure, a system and method for sparse collaborative computer aided diagnosis substantially eliminates irrelevant and redundant features in the detection of multiple clinically-related malignant structures from medical images. A probabilistic interpretation is described to justify exemplary formulations. A exemplary collaborative prediction approach has been implemented and validated on the automatic detection of solid lung nodules by jointly detecting ground glass opacities.

Referring now to an exemplary application of a sparse collaborative computer aided diagnosis system and method consider the case on lung cancer: lung cancer is a leading cause of cancer-related death in western countries with a better survival rate for early diagnosis. An automated CAD system can be built to identify solid nodules or ground glass opacities (GGOs). A patient who has solid nodules can also have GGOs, whereas a patient who has GGOs can later develop calcified GGOs which become solid or partly-solid nodules. Radiologic classification of small adenocarcinoma of lung by means of thoracic thin-section CT discriminates between the GGOs and solid nodules. The solid nodule is defined as an area of increased opacification more than 5 mm in diameter, which completely obscures underlying vascular markings. Ground-glass opacity (GGO) is defined as an area of a slight, homogeneous increase in density, which does not obscure underlying vascular markings. FIGS. 1A-B shows examples of a solid nodule 101 and a GGO 102, respectively. The two detection systems are typically constructed independently. Detecting nodules and detecting GGOs are two closely dependent tasks whereas each also has its own respective characteristics, which makes joint learning beneficial when building a specific model for each task for better predictive capacity.

An exemplary collaborative computer aided diagnosis system improves diagnosis of a single malignant structure by learning the detection process of multiple related abnormal structures from medical images simultaneously. It takes advantage of the opportunity to compare and contrast similar medical conditions in learning to diagnose patients in terms of disease categories.

According to an embodiment of the present disclosure, across-task relatedness with a prior as sharing is modeled as a common subset of features. A framework, based on mathematical programming, is implemented for eliminating features that are irrelevant or redundant for all tasks. Classifiers are constructed for each task by further selecting features from the common set. Although the framework is general enough to be employed in any application where supervised machine learning problems are involved, an important application domain lies in the area of computer aided diagnosis with medical images.

According to an embodiment of the present disclosure, a system and method for collaborative computer-aided diagnosis may be based on existing classification or regression methods that deal with a single task. In an exemplary implementation, two methods, one for regression, one for classification, are used for selecting relevant features or variables for multiple tasks. These two methods are developed on top of ridge regression and 1-norm SVM (Support Vector Machine) methods, respectively.

Assume that T tasks in total have been given with a sample set $\{(x_i^t, y_i^t), i=1, \ldots, l_t\}$ for the t-th task where $x \in R^n$. To simplify the notation, $X_t$ is used to denote the feature matrix where the i-th row corresponds to the transpose of $x_i^t$, and $y_t$ to denote the label vector where the i-th component is $y_i^t$. Notice that y can take integer numbers $\{-1,1\}$ for classification or is continuous for regression.

An ridge regression method for solving a single task, such as the t-th task, can be stated as follows:

$$\min_{\alpha_t} \|y_t - X_t \alpha_t\|^2 + \mu \|\alpha_t\|^2 \quad (1)$$

where $\|\cdot\|$ denotes 2-norm of a vector and $\mu$ is the regularization parameter that controls the balance between the error term and the penalty term, the first and second terms in (1), respectively.

The 1-norm SVM for solving a single classification task t may be stated as follows:

$$\min_{\alpha_t} \quad \|\xi_t\|_1 + \mu \|\alpha_t\|_1 \quad (2)$$
$$\text{subject to} \quad y_t \otimes (X_t \alpha_t) \geq 1 - \xi_t,$$
$$\xi_t \geq 0,$$

where $\hat{\times}$ denotes the component-wise multiplication between two matrices (or vectors).

Referring to FIG. 4, the feature selection problem for an input image having features 400 can be formulated as an integer programming problem, which is a combinatorial optimization problem. Denote a matrix B as an n×n diagonal matrix with its j-th diagonal element equal to $\beta_j \in \{0,1\}$. B is an indicator matrix indicating whether or not a feature is used to build a model; the indicator matrix is initially provided as an identity matrix but may be provided as another matrix 401. It should be appreciated that the matrix used may be considered to be a vector, e.g., a diagonal in the matrix. For each task, instead of learning a model $y=x^T\alpha$, a model $y=x^T B\alpha$ is constructed where $\alpha$ is task-specific while the same B will be used across different tasks 402. If $\beta_j=0$, the j-th variable is not used in any model for all tasks regardless of the value of a specific $\alpha$. Otherwise if $\beta_j=1$, the j-th variable appears in all models but an appropriate $\alpha$ vector can rule out this feature for a particular task. Then $XB\alpha=\tilde{X}c$ where $\tilde{X}$ only contains the selected features and c corresponds to nonzero components of $B\alpha$. Then the feature selection approach for learning multiple tasks based on ridge regression is formulated as the following mixed integer program:

$$\min_{\beta} \min_{\alpha_t} \quad \sum_{t=1}^{T} (\|y_t - X_t B \alpha_t\|^2 + \mu_t \|B\alpha_t\|^2) \quad (3)$$
$$\text{subject to} \quad B = diag(\beta), \|\beta\|_0 = m,$$
$$\beta_j \in \{0, 1\}, j = 1, \ldots, n.$$

where $\|\beta\|_0$ denotes the 0-norm, which controls the cardinality of $\beta$, (notice the 0-norm is not really a vector norm). The operator $diag(\beta)$ is used to transfer a vector $\beta$ into a matrix whose diagonal vector is equal to $\beta$. This program chooses m important features out of n features for all tasks 403.

Problem (3) is computationally intractable or expensive since it uses a branch-and-bound procedure to optimize integer variables $\beta$. Development of mathematically tractable formulations is needed for practical applications. The constraints on integer variables $\beta$ are relaxed to allow them to take real numbers. Then these $\beta$ variables correspond to certain scaling factors determining how significantly the corresponding features contribute to the target y. The sparsity of $\beta$ is enforced. Sparsity can be enforced by restricting the cardinality of $\beta$ to exactly m as in (3), or by employing the 1-norm regularization condition on $\beta$, which is less stringent than the 0-norm penalty. To derive computationally efficient and scalable formulations, the problem (3) is relaxed to impose a constraint on the 1-norm of $\beta$. The relaxation of problem (3) becomes:

$$\min_{\beta} \min_{\alpha_t} \quad \sum_{t=1}^{T} (\|y_t - X_t B \alpha_t\|^2 + \mu_t \|B\alpha_t\|^2) \quad (4)$$
$$\text{subject to} \quad B = diag(\beta), \|\beta\|_1 \leq \delta,$$
$$\beta_j \geq 0, j = 1, \ldots, n.$$

where $\mu_t$ and $\delta$ are parameters to be tuned and pre-specified before solving problem (4).

Adding matrix B to the 1-norm SVM (2) and applying the above relaxation yield a multi-task feature selection approach for classification which is formulated as follows:

$$\min_\beta \quad \min_{\alpha_t} \quad \sum_{t=1}^T (\|\xi_t\|_1 + \mu_t \|B\alpha_t\|_1) \tag{5}$$

$$\text{subject to} \quad y_t \otimes (X_t B\alpha_t) \geq 1 - \xi_t,$$

$$\xi_t \geq 0, t = 1, \ldots, T.$$

$$B = diag(\beta), \|\beta\|_1 \leq \delta,$$

$$\beta_j \geq 0, j = 1, \ldots, n.$$

Formulations (4) and (5) are non-convex and involve 4th order polynomials in the objective (4) or quadratic forms in constraints (5). Efficient algorithms for solving these formulations are developed below by way of two exemplary implementations.

A probabilistic interpretation is derived using multi-task ridge regression as an example. Note that the probabilistic interpretation could be easily generalized to other loss functions. Consider the following generative framework:

$$y_t = X_t B\alpha_t + \epsilon_t$$

$$\epsilon_t \sim \text{Norm}(0, \sigma_t I)$$

$$p(\beta_i) \sim \rho^{\beta_i}(1-\rho)^{1-\beta_i}$$

$$p(\alpha_t | B) = P(B\alpha_t) \sim \text{Norm}(0, \hat{\sigma} I)$$

$$B = diag(\beta) \text{ and } \beta_i \in \{0,1\}$$

where a Bernoulli distribution is used with parameter $\rho$ for each $\beta_i, i=1, \ldots, d$. The value of $\rho$ will affect the likelihood of including a given feature. For example, setting $\rho=1$ will preserve all features and smaller $\rho$ values will result in the use of fewer features. The conditional probability $\rho(\alpha_t|B)$ tells that if the feature i is selected, the corresponding $\alpha_{ti}$ for all tasks follows a zero mean Normal distribution; otherwise it follows a non-informative distribution. Furthermore, the noises are assumed independent of each other between different tasks and also the following independency conditions hold:

$$p(\beta) = \Pi_{i=1}^d p(\beta_i)$$

$$p(\alpha_1 \ldots \alpha_T | B) = \Pi_{i=1}^T p(\alpha_i | B).$$

The posterior conditional distribution of model parameters $(\alpha_1, \ldots, \alpha_T, \beta)$ satisfies, in the log form, $$\log P(\alpha_1, \ldots, \alpha_T, \beta | X_1, y_1, \ldots, X_T, y_T) =$$

$$\sum_{t=1}^T \left( \begin{array}{c} \|y_t - X_t B\alpha_t\|^2 + \\ \mu_t \|B\alpha_t\|^2 \end{array} \right) + \lambda \sum_{i=1}^d \beta_i + C.$$

where $\mu_t = \sigma_t^2/\hat{\sigma}^2, \lambda = \log(\rho/(1-\rho))\Sigma\sigma_t^2$ and C is the normalization constant, and can be ignored.

The above derivation assumes $\beta_i \in \{0,1\}$. By relaxing the integer constraint with a nonnegative constraint $\beta_i \geq 0$, maximizing the above posterior distribution of model parameters will give an equivalent formulation of (4).

The residual term in the objective of problem (4) is bilinear with respect to $\beta$ and $\alpha_t$. The 2-norm of the residual introduces to the optimization problem high order polynomials and thus the problem is still arduous to solve. An alternating optimization approach may be implemented to solve formulation (4) by repeating steps depicted in EI 1, which is similar to the principle of Expectation-Maximization (EM) algorithms. Moreover, note that $\|\beta\|_1 = \Sigma\beta_j$ due to the non-negativity of $\beta_j$.

Exemplary Implementation (EI) 1

Fix B to the current solution (initially to the identity matrix I, a random matrix or another appropriate matrix), convert $\tilde{X}_t \leftarrow X_t B$, solve the following problem for optimal $\hat{\alpha}$, $\min_{\alpha_t}$ $$\sum_{t=1}^T (\|y_t - \hat{X}_t \alpha_t\|^2 + \mu_t \|B\alpha_t\|^2) \tag{6}$$

(see 404, FIG. 4B)

Fix $\alpha_t$ to the solution obtained at the above step, convert $\hat{X}_t \leftarrow X_t \cdot diag(\alpha_t)$, solve the following problem for optimal $\hat{\beta}$, $$\min_{\beta \geq 0} \quad \sum_{t=1}^T (\|y_t - \hat{X}_t \beta\|^2 + \mu_t \|\beta \otimes \alpha_t\|^2) \tag{7}$$

$$\text{subject to} \quad \|\beta\|_1 \leq \delta.$$

(see 405, FIG. 4B)

The algorithm can also take a greedy scheme to perform $B \leftarrow B \otimes diag(\hat{\beta})$ after the block 406. The greedy scheme is not needed, but it can be used to assure that features receiving small scaling factors in early iterations will continue receiving small weights. This greedy step speeds up the convergence process but makes the algorithm very likely terminate at sub-optimal solutions.

The block 404 of EI 1 solves a ridge regression problem. Note that the problem (6) can be de-coupled to minimize $(\|y_i - \tilde{X}_t \alpha_t\|2 + \mu_t \|B\alpha_t\|2)$ for each individual $\alpha_t$ of task t. Thus, the problem (6) actually has a closed-form solution, which is to solve $B(X_t^T X_t + \mu_t I)B\alpha_t = BX_t y_t$ where B is a diagonal matrix with some diagonal components possibly equal to 0. So the solution is $\hat{\alpha}_t B^{-1}(X_t^T X_t + \mu_t I)^{-1} X_t y_t$ where $B^{-1}$ denotes the pseudo-inverse of B, a diagonal matrix whose non-zero diagonal elements equal the inverse of nonzero diagonal components of B. The matrix inversion $(X_t^T X_t + \mu_t I)^{-1}$ only needs to be calculated in the first iteration and can then be reused in later iterations, thus gaining computational efficiency.

The block 405 of EI 1 solves a quadratic programming problem. Denote $\Lambda_t = diag(\alpha_t)$. The problem (7) can be rewritten in the following canonical form of a quadratic program:

$$\min_{\beta \geq 0} \quad \beta^T \sum_{t=1}^T (\Lambda_t (X_t^T X_t + \mu_t I) \Lambda_t) \beta - 2 \left( \sum_{t=1}^T y_t^T X_t \Lambda_t \right) \beta \tag{8}$$

$$\text{subject to} \quad e^T \beta \leq \delta.$$

Problem (8) is a simple quadratic program where e is the vector of ones of proper dimension, but a quadratic problem is less scalable than a linear program from the optimization perspective.

The proposed multi-task feature selection approach seeks a subset of m (or few) features of X so that the best ridge regression models for each of the tasks can be attained using the selected features. The standard formulation (1) minimizes the quadratic loss and is subject to capacity control determined by the 2-norm penalty. Recent studies have shown that the 1-norm regularization together with the absolute deviation loss is equally suitable to learning regression or classification models, and often produces sparse solutions for better approximation. Similarly, EIs 1 and 2 can generalize to other loss functions and various regularization penalties.

Following the derivation of EI 1 for multi-task ridge regression, an alternating algorithm for the multi-task 1-norm SVM (5) was designed in EI 2.

EI 2

Fix B to the current solution, convert $\tilde{X}_t \leftarrow X_t B$, solve the following problem for optimal $\hat{\alpha}_t$, $$\min_{\alpha_t, \xi_t, v_t} \sum_{t=1}^{T} (e^T \xi_t + \mu_t \beta^T v_t) \quad (9)$$

subject to $y_t \otimes (X_t \alpha_t) \geq 1 - \xi_t,$ $\xi_t \geq 0, t = 1, \ldots, T,$ $-v_t \leq \alpha_t \leq v_t, t = 1, \ldots, T.$ (9) (see 404, FIG. 4B)

Fix $\alpha_t$ to the solution obtained at the above step, convert $\hat{X}_t \leftarrow X_t \cdot \text{diag}(\alpha_t)$, solve the following problem for $$\min_{\beta \geq 0} \sum_{t=1}^{T} e^T \xi_t + \left(\sum_{t=1}^{T} \mu_t \alpha_t\right)^T \beta \quad (10)$$

subject to $y_t \otimes (X_t \beta) \geq 1 - \xi_t,$ $\xi_t \geq 0, t = 1, \ldots, T,$ $e^T \beta \leq \delta.$ (see 405, FIG. 4B)

Note that both problems (9) and (10) are linear programs, and can be solved efficiently. Further, problem (9) can be decoupled as well to optimize each individual $\alpha_t$ separately by minimizing $e^T \xi_t + \mu_t \beta^T v_t$ with constraints $y_t \otimes (X_t \alpha_t) \geq 1 - \xi_t$, $\xi_t \geq 0, -v_t \leq \alpha_t \leq v_t$. These T sub problems are small and thus the overall algorithm is scalable.

A validation of an exemplary approach on classification tasks was performed by comparing it to standard approaches where tasks are solved independently using the 1-norm SVM, and comparing it to the pooling method where a single model is constructed using available data from all tasks. These methods represent two extreme cases: the former one treats multiple tasks completely independently assuming no relatedness; the latter one treats all tasks identically. Experimental results clearly show that the multi-task learning approach as proposed is superior to these extreme cases. Also implemented was another multi-task learning approach (Evegniou & Pontil 2004) that is derived based on the regularization principle which has been compared it to an exemplary implementation of the present disclosure in terms of performance.

Synthetic data was generated to verify the behavior of various methods regarding the selected features and the accuracy in comparison with single-task 1-norm SVM. The synthetic data was generated as follows.

Synthetic Data Generation

1. Set number of features d=10, number of tasks T=3.
2. Generate $x \in R^{10}$ with each component $x_i \sim \text{Uniform}[-1, 1], i=1, \ldots, 10$.
3. The coefficient vectors of three tasks are specified as:
$\beta_1 = [1, 1, 0, 0, 0, 0, 0, 0, 0, 0]$
$\beta_2 = [1, 1, 1, 0, 0, 0, 0, 0, 0, 0]$
$\beta_3 = [0, 1, 1, 1, 0, 0, 0, 0, 0, 0]$
4. For each task and each data vector, $y = \text{sign}(\beta^T x)$.

Figure 2B:
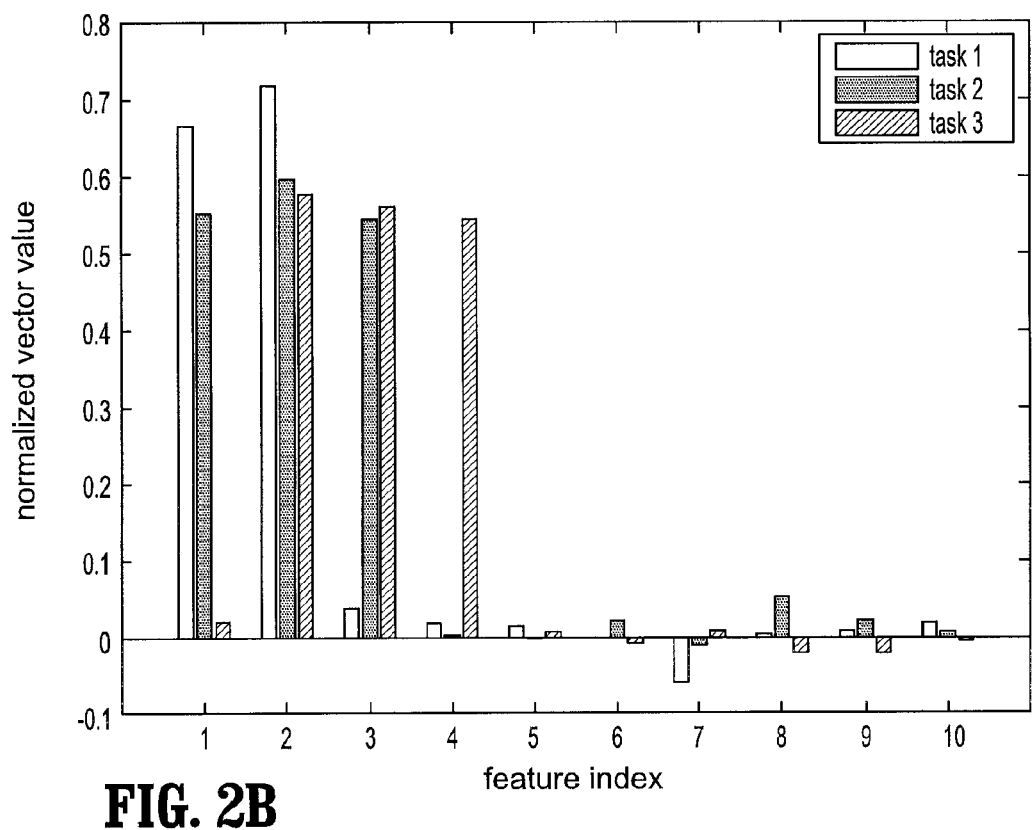
Figure 2C:
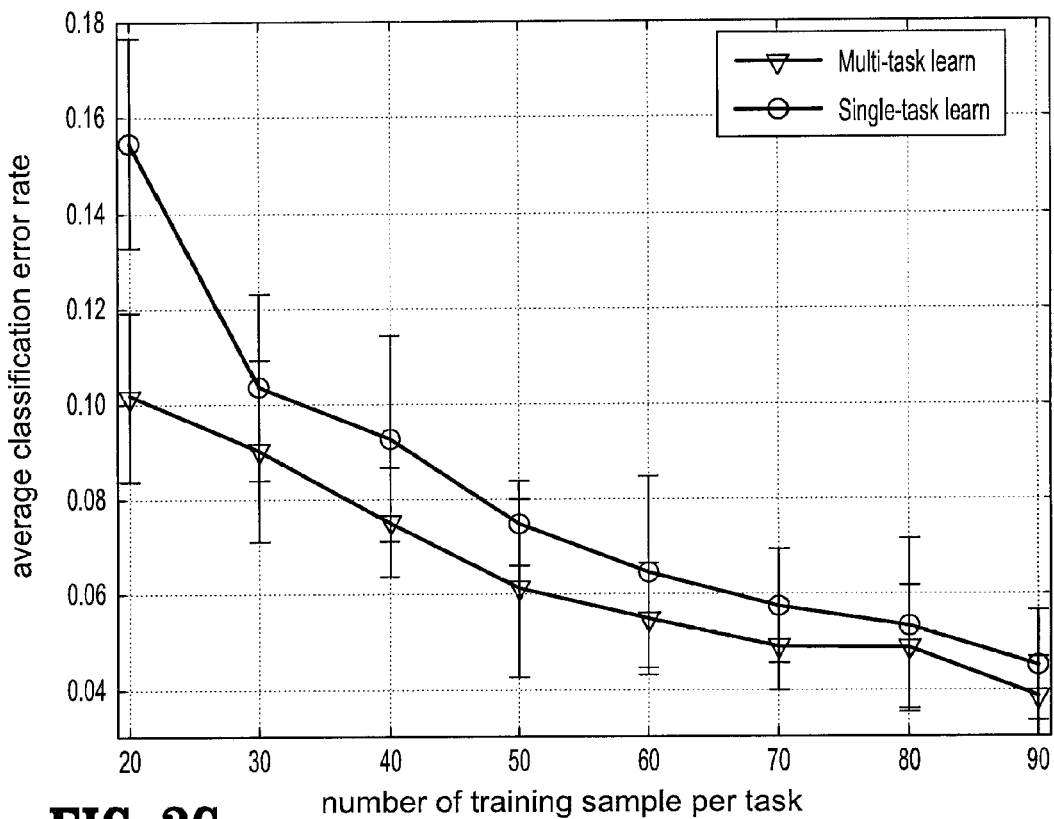

For each task, training sets of sizes from 20 to 90 were generated, each used in a different trial, 150 samples for validation and 1000 samples for testing, and repeated each trial 20 times. In FIGS. 2A-C, a bar plot of the averaged estimated coefficient vectors by a collaborative approach and the single-task 1-norm SVM. Clearly, the collaborative approach successfully removed all irrelevant features. Since linear classifiers were used, re-scaling the classifier by a constant did not have effect on predictions. Each coefficient vector was normalized by its norm, then averaged over all runs in all trials, and shown on FIGS. 2A-C. Although single-task learning also produced reasonable classifiers for each task, it could not remove all irrelevant features using data available for each individual task in every trial.

FIG. 2C shows the prediction results. For lucid presentation, the classification errors of the three tasks are arranged over 20 runs and drawn them in FIGS. 2A-B with error bars proportional to error standard deviation. It shows that the collaborative approach outperforms the single-task approach and as expected, the difference of the two approaches becomes smaller as the sample size of each task becomes larger.

The standard paradigm for computer aided diagnosis of medical images follows a sequence of three stages: identification of potentially unhealthy candidate regions of interest (ROI) from the image volume, computation of descriptive features for each candidate, and classification of each candidate (e.g., normal or diseased) based on its features.

An exemplary prototype version of a lung CAD system was applied on a proprietary de-identified patient data set. The nodule dataset consisted of 176 high-resolution CT images (collected from multiple sites) that were randomly partitioned into two groups: a training set of 90 volumes and a test set of 86 volumes. The GGO dataset consisted of 60 CT images. Since there were only a limited number of GGO cases, they were not partitioned beforehand to have a test set. The original goal was to use the additional GGO cases to improve the nodule detection performance. In total, 129 nodules and 53 GGOs were identified and labeled by radiologists. Among the marked nodules, 81 appeared in the training set and 48 In the test set. The training set was then used to optimize the classification parameters, and construct the final classifier which was tested on the independent test set of 86 volumes.

The candidate identification algorithm was independently applied to the training, test nodule sets and the GGO set, achieving 98.8% detection rate on the training set at 121 FPs per volume, 93.6% detection rate on the test set at 161 FPs per volume and 90.6% detection rate on the GGO set at 169 FPs per volume, resulting in totally 11056, 13985 and 10265 candidates in the respective nodule training, nodule test and GGO sets. There can exist multiple candidates pointing to one nodule or one GGO, so 131, 81 and 87 candidates were labeled as positive in the training set, test set and GGO set, respectively. A total of 86 numerical image features were designed to depict both nodules and GGOs. The feature set contained some low-level image features, such as size, shape, intensity, template matching features, and some high-level features, such as multi-scale statistical features depicting sophisticated higher-order properties of nodules and GGOs. The specifications of all the related data sets are summarized in Table 1 for clarity.

TABLE 1

|         | Nodule train | Nodule test | GGO   |
|---------|--------------|-------------|-------|
| # patients | 90        | 86          | 60    |
| # cand.    | 11056     | 13985       | 10265 |
| # cancer   | 81        | 48          | 53    |
| # positives| 131       | 81          | 87    |
| # FP/vol   | 121       | 161         | 169   |
| # feature  | 86        | 86          | 86    |

Experimental setting and performance: A first set of experiments were conducted as follows. 50% (45 volumes) of the nodule patient data were randomly sampled from the training set, 50% (30 volumes) of the GGO patient data. These samples were used in the training phase. Notice that the random sampling can only take place at the patient level rather than the candidate level since otherwise information from a single patient may appear in both training and test sets, making the testing not independent. The nodule classifiers obtained by our approach and three other approaches were tested on the unseen test set of 86 patient cases.

EI 2 has been compared to the single task 1-norm SVM, the pooling method with 1-norm SVM, and the regularized MTL (Evegniou & Pontil 2004). In the first trial, the model parameters such as $\mu_1, \mu_2, \delta$ in EI 2 and the regularized parameters were tuned according to a 3-fold cross validation performance, and $\mu_1=0:2$ for GGOs, $\mu_2=1$ for nodules were the best choice for single task learning. Then parameters were fixed for other trials, and used the same μs in the proposed multi-task learning formulation (5) for a fair comparison since the multi-task learning had the same parameter settings as a start, and then tuned $\delta(=10)$ to improve performance. Note that the proposed EI 2 may produce better performance if μ is tuned according to its own cross validation performance.

Figure 3A:
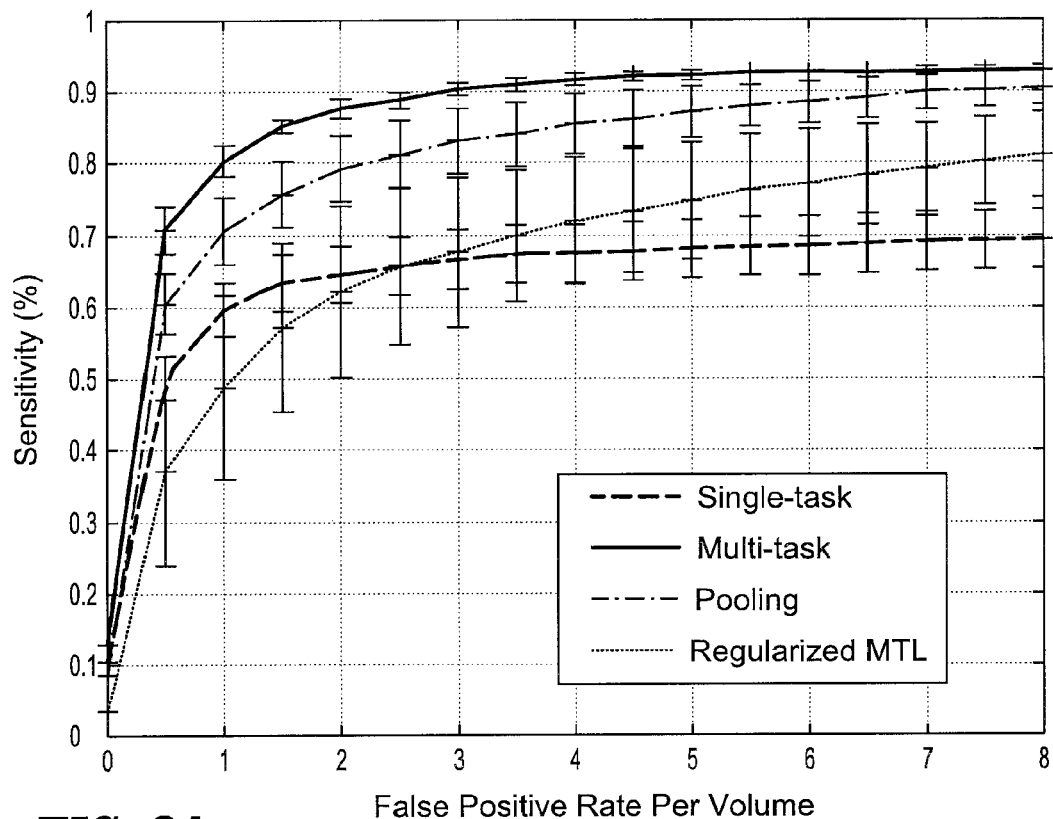
FIG. 3A is a graph of a ROC plot on 50% of nodule and GGO training patient volumes.

FIG. 3A shows ROC curves averaged over the 15 trials together with test error bars as the standard deviation of detection rates of the 15 trials. Clearly, EI 2 generates a curve that dominates the ROC curves corresponding to other approaches. It also had a relatively small model variance by referencing the error bars. The classifier test error variance of the regularized MTL varied significantly with variations of samples as shown in FIG. 3.

Figure 3B:
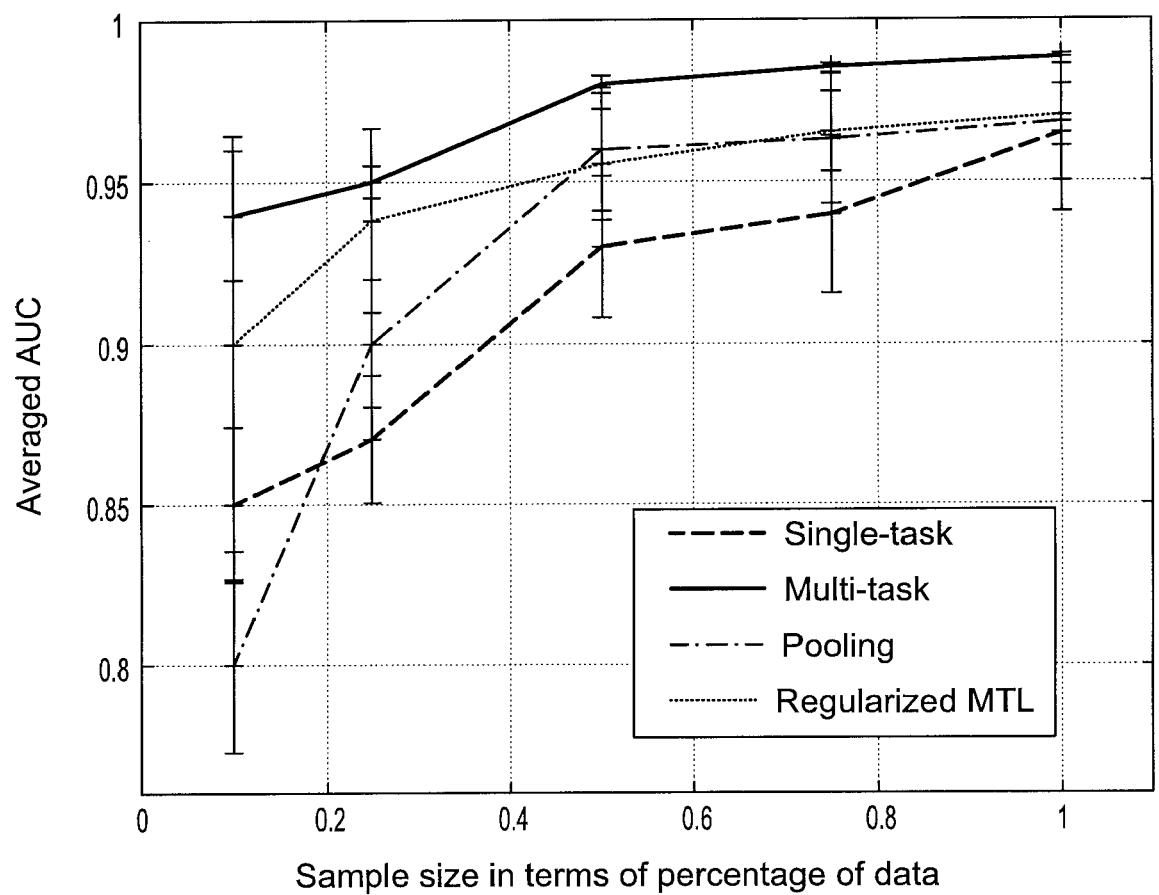
FIG. 3B is a graph of the AUC plot versus sample size, respectively.

The performance comparisons with area-under-the-ROC-curve (AUC) measure are reported since AUC is independent of the selected decision criterion and prior probabilities. p% of training nodule set were randomly sampled and the GGO was set where p=10; 25; 50; 75; 100. When more and more data for a specific task is available, the resulting model achieves better performance, and accurate models can be learned with less help from other related tasks. The AUC numbers were averaged over 15 trials for each sample size choice p. FIG. 3B illustrates the averaged AUC values and associated error bars. Our method presents relatively small model variance in comparison with the regularized MTL (multi-task learning) as shown in the error bars.

A recent paper proposes a method to learn sparse feature representation from multiple tasks. It does not directly enforce sparsity on original feature set if orthonormal transformation is applied to features since the orthonormal matrix U is not in general sparse. This method may be implemented using U=I for comparison. Our method provides more sparse solutions $B\alpha_t$.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
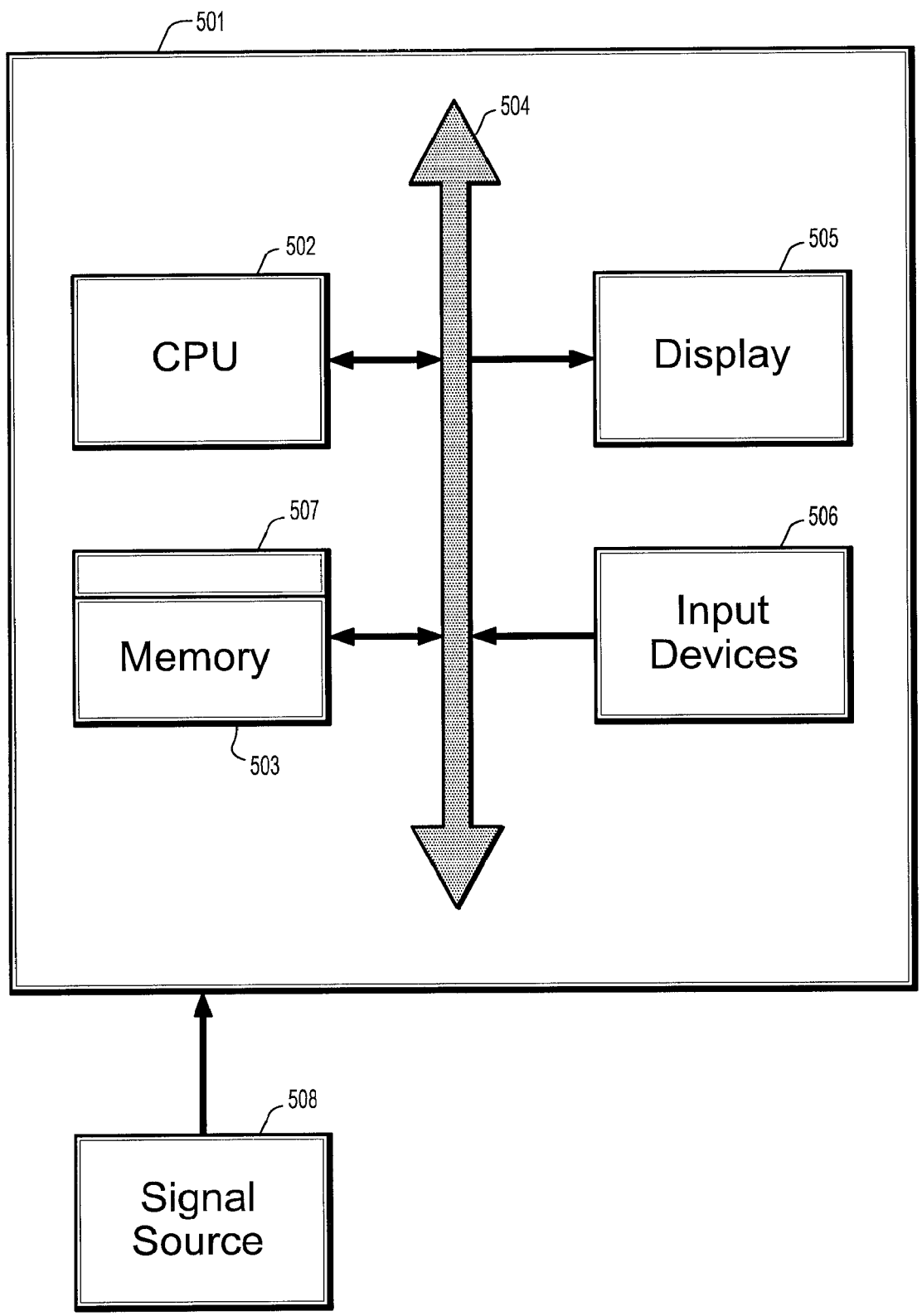
FIG. 5 is a diagram of a system according to an embodiment of the present disclosure.

Referring to FIG. 5, according to an embodiment of the present invention, a computer system 501 for sparse collaborative computer aided diagnosis can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process a signal, e.g., a closed surface mesh, from the signal source 508. As such, the computer system 501 is a general purpose computer system that becomes a specific purpose computer system when executing the routine 507 of the present invention. The computer system 501 may further include a GPU 509 for processing certain operations.

The computer platform 501 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for sparse collaborative computer aided diagnosis, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for automatically constructing a model of a medical image comprising:
   providing a medical image with n image features;
   automatically determining a diagonal indicator matrix having m non-zero diagonal components corresponding to m features selected from the n image features, wherein the indicator matrix is used across different computer aided diagnosis (CAD) modeling tasks, wherein automatically determining the diagonal indicator matrix comprises:
   initializing the diagonal indicator matrix;
   iteratively fixing the diagonal indicator matrix to a current value and determining a value for parameters of the specific CAD modeling task, and fixing a plurality of individual models corresponding to a plurality of specific CAD modeling tasks, and determining the diagonal indicator matrix which is performed on the plurality of specific CAD modeling tasks; and automatically constructing a model of the image based on the selected m features, wherein the model includes a subset of the m features for a specific CAD modeling task.

2. The method of claim 1, further comprising weighting values of the parameters after each iteration to slow changes in the parameters.

3. The method of claim 1, embodied in a non-transitory computer readable medium embodying instructions executable by a processor to perform the method modeling an image.

4. A system for automatically constructing a model of a medical image comprising:

a memory device storing a plurality of instructions embodying a feature selector;

a processor for receiving an image with n image features and executing the feature selector to perform a method comprising:

automatically determining a diagonal indicator matrix having m non-zero diagonal components corresponding to m features selected from the n features, wherein the indicator matrix is used across different computer aided diagnosis (CAD) modeling tasks, wherein automatically determining the diagonal indicator matrix comprises:

initializing the diagonal indicator matrix;

iteratively fixing the diagonal indicator matrix to a current value and determining a value for parameters of the specific (CAD) modeling task, and fixing a plurality of individual models corresponding to a plurality of specific (CAD) modeling tasks, and determining the diagonal indicator matrix which is performed on the plurality of specific (CAD) modeling tasks; and automatically constructing a model of the image based on the selected m features, wherein the model includes a subset of the m features for a specific (CAD) modeling task.

5. The method of claim 4, further comprising weighting values of the parameters after each iteration to slow changes in the parameters.

6. A method for automatically producing a plurality of models of a medical image comprising:

providing an image with n image features;

initializing a diagonal indicator matrix having m non-zero diagonal components corresponding to m features selected from the n features, wherein the indicator matrix is used across a plurality of computer aided diagnosis (CAD) modeling tasks, each (CAD) modeling task producing a corresponding one of the plurality of models;

iteratively fixing the diagonal indicator matrix to a current value and determining a value for parameters of the specific (CAD) modeling task, and fixing a plurality of individual models corresponding to a plurality of specific (CAD) modeling tasks, and determining the diagonal indicator matrix which is performed on the plurality of specific (CAD) modeling tasks; and automatically constructing the plurality of models of the image based on the selected m features, wherein the models each include a corresponding subset of the m features.

7. The method of claim 6, further comprising weighting values of the parameters after each iteration to slow changes in the parameters.

8. The method of claim 6, embodied in a non-transitory computer readable medium embodying instructions executable by a processor to perform the method modeling an image.

* * * * *